(12) United States Patent
Lyons

(10) Patent No.: US 10,756,519 B2
(45) Date of Patent: Aug. 25, 2020

(54) CABLE STRIPPING TOOL

(71) Applicant: Kevin P. Lyons, Enumclaw, WA (US)

(72) Inventor: Kevin P. Lyons, Enumclaw, WA (US)

(*) Notice: Subject to any disclaimer, the term of this patent is extended or adjusted under 35 U.S.C. 154(b) by 153 days.

(21) Appl. No.: 15/793,761

(22) Filed: Oct. 25, 2017

(65) Prior Publication Data

US 2019/0123526 A1 Apr. 25, 2019

(51) Int. Cl.
*H02G 1/12* (2006.01)

(52) U.S. Cl.
CPC ......... *H02G 1/1221* (2013.01); *H02G 1/1241* (2013.01)

(58) Field of Classification Search
CPC .. H02G 1/1221; H02G 1/1241; H02G 1/1224; H02G 1/1226; Y10T 83/04; Y10T 83/8727; Y10T 83/8732
USPC .............. 30/92, 93, 94, 95, 109, 111; 81/9.4
See application file for complete search history.

(56) References Cited

U.S. PATENT DOCUMENTS

| | | | |
|---|---|---|---|
| 1,544,393 A * | 6/1925 | Hatcher | B21K 25/00 29/251 |
| 6,161,289 A | 12/2000 | Alexander | |
| 6,381,850 B1 | 5/2002 | Warner | |
| 6,668,458 B1 | 12/2003 | Schoenleber | |
| 7,770,858 B2 * | 8/2010 | Fehrenbach | F16M 11/10 248/284.1 |
| 2005/0066466 A1 * | 3/2005 | Butterfield | A47L 13/08 15/236.01 |

* cited by examiner

*Primary Examiner* — Phong H Nguyen
(74) *Attorney, Agent, or Firm* — Klarquist Sparkman, LLP

(57) ABSTRACT

Disclosed herein are adapter assemblies for use with a cable stripper and a power drill. Some disclosed assemblies include a cable stripper comprising a body and one or more cutting heads coupled to an adapter. Exemplary embodiments comprising an adapter comprising a bracket having an engagement member, where the engagement member is configured to engage with a factory power drill chuck. The adapter may further comprise a pivot pin for hingedly coupling the adapter and the cable stripper, while allowing the cable stripper to rotate relative to the adapter so that a user can select from the one or more cutting heads of the cable stripper. The adapter may further comprise a locking mechanism which when in the locked position prevents the cable stripper from pivoting relative to the adapter.

5 Claims, 2 Drawing Sheets

CABLE STRIPPING TOOL

FIELD

The present disclosure relates to adapters for wire or cable insulation strippers, and, more particularly, to adapters for connecting a power drill to a wire or cable insulation stripper.

BACKGROUND

Conductive wires and cables generally have inner conductive elements surrounded by one or more layers of insulation. There are many applications in which it is necessary to strip the insulation and/or shielding material from the end of a wire or cable in such a manner that the inner elements are exposed.

Wire and cable stripping tools known in the art range from hand-operated tools to motorized machinery. For example, some tools allow a user to use a power drill together with a cutting device to strip insulation from a cable, such as those described in U.S. Pat. No. 6,381,850 to Warner, or U.S. Pat. No. 6,668,458 to Schoenleber. However, such tools are generally configured to be used with a particular cable gauge, and different tools must be used for each differing cable size. U.S. Pat. No. 6,161,289 to Alexander discloses a block comprising differently sized bores for use with differently sized gauges. However, the bores in the cutting tool described in Alexander are disposed circumferentially around the face of a cylindrical element. This means that when a cable is inserted into a bore and the cylindrical element is rotated the bore itself will move around the perimeter of the cylindrical element, pulling the cable with it. This is an ineffective means of stripping insulation which may cause the cable to whip around and may even damage the inner conductive elements of the cable.

Some well-known cable stripping tools include one or more cutting heads with bores for receiving a cable. The bore size and positioning of the cutting element may be different in the different cutting heads such that each differently sized head can be used with a different gauge of cable. Some cable strippers known in the art have cylindrical or X-shaped bodies, with different cutting heads disposed on each terminal end of the cable stripper. Such tools allow a user to switch between cutting heads with ease to strip different sizes of cable, and prevent a user from having to bring multiple cable strippers. However, due to the selectable nature of the multi-headed cable strippers, they are typically operated by hand so that a user can easily pivot between cutting heads.

It is usually the case that a person can strip wire faster with a knife than with a hand operated multi-headed cable stripper. However, when the stripping operation is performed with a knife, the risk of injury greatly increases for the operator.

Accordingly, disclosed is a device that can be used to adapt hand-operated cable strippers for use with a power tool, while still allowing a user to select between a variety of cutting heads.

SUMMARY

In one aspect in accordance with at least one embodiment, an adapter is provided for attachment to a factory cable stripper to adapt the cable stripper for use with a power drill. The adapter may comprise a bracket configured to attach to a body of the cable stripper, such as via a hinge assembly. The adapter allows a user to use a cable stripper without having to turn the device by hand, alleviating strain and saving time. The hinged attachment of the adapter to the cable stripper allows a user to pivot the cable stripper with respect to the adapter, allowing a user to select from one or more cutting heads of the cable stripper.

Also disclosed herein are various mounting assemblies, adapter designs, and accessories for use with such adapters. Some disclosed adapters can be configured to have a locking mechanism that allows or does not allow the cable stripper to be pivoted relative to the adapter.

Some embodiments include an adapter for use with a cable stripper comprising a body and one or more cutting heads, the adapter comprising a bracket configured to be mounted to the body of the cable stripper and an engagement member configured to releasably couple with the chuck of a power drill. In some embodiments the cable stripper may have more than one cutting head. In some embodiments the cable stripper may have two cutting heads disposed on opposite ends of a body. In some embodiments the cable stripper may have four cutting heads arranged in a coplanar X shape. In some embodiments the bracket is configured to fit over one or more cutting heads of the cable stripper while mounted to the body of the cable stripper.

In some embodiments the adapter comprises a pivot pin extending through a first and second side of the bracket and the body of the cable stripper, coupling the adapter to the cable stripper and allowing the cable stripper to pivot relative to the adapter.

In other embodiments the first and second sides of the bracket may comprise first and second posts, extending from an inner surface of the bracket. The first and second posts may releasably or permanently couple with corresponding recesses in the body of the cable stripper in such a way that the cable stripper can pivot with respect to the adapter. In some embodiments the first and second post may be formed integrally with the first and second side respectively. In other embodiments some other fastening means may be used to couple the adapter to the cable stripper.

In some embodiments the adapter further includes a locking mechanism configured to prevent the cable stripper from pivoting when in the locked position. In some embodiments the locking mechanism comprises a locking member that can reversibly engage a corresponding recess in the body of the cable stripper. In other embodiments the locking mechanism may comprise a biasing member, catch, or other fastening. In some embodiments the locking mechanism may comprise an actuator, useable by a user to move the adapter from a locked position to an unlocked position, or vice versa. In some embodiments the actuator may be a knob which when pulled by a user retracts a locking member from a corresponding recess in the body of the cable stripper. In some embodiments twisting the knob can hold the actuator in the unlocked position and prevent the locking member from returning to the locked position. In other embodiments the actuator may be a button, lever, or other structure.

Some embodiments include a method for using an adapter with a cable stripper, comprising selecting a cutting head of the cable stripper, coupling the adapter to a power drill, applying the cutting head of the cable stripper to a cable, activating the power drill such that the cutting head of the cable stripper rotates with respect to the cable, and stripping a selected amount of insulation from the cable.

In some embodiments, the method further comprises releasing a locking mechanism of the adapter, pivoting the cable stripper to a selected second cutting head, allowing the locking mechanism of the adapter to engage, applying the second cutting head to a second cable, activating the power drill such that the second cutting head rotates with respect to the second cable, and stripping a selected amount of insulation from the second cable.

In some embodiments the step of releasing the locking mechanism comprises retracting a locking member of the adapter from a corresponding recess in the body of the cable stripper.

In some embodiments, the step of coupling the adapter to the power drill comprises inserting an engagement member of the adapter into a chuck of the power drill and tightening the chuck.

In some embodiments the cable stripper may comprise 4 cutting heads. In other embodiments the cable stripper may comprise 2 or 3 cutting heads.

The foregoing and other objects, features, and advantages of the disclosure will become more apparent from the following detailed description, which proceeds with reference to the accompanying figures.

BRIEF DESCRIPTION OF THE DRAWINGS

To better understand the present disclosure and appreciate its practical applications, the following Figures are provided and referenced hereafter. It should be noted that the Figures are given as examples only and in no way limit the scope of the disclosure as defined in the appended claims.

DETAILED DESCRIPTION

Described herein are examples of an adapter assembly and components thereof which can allow a cable stripper to be used with a power drill. For example, in some embodiments, an adapter can allow a user to easily switch between a number of differently sized cutting heads of a cable stripper, while allowing the cable stripper to be operated by a power drill. This allows a user the versatility of using a cable stripper with many cutting head sizes, without having to manually turn the cable stripper, saving time and energy.

Figure 1:
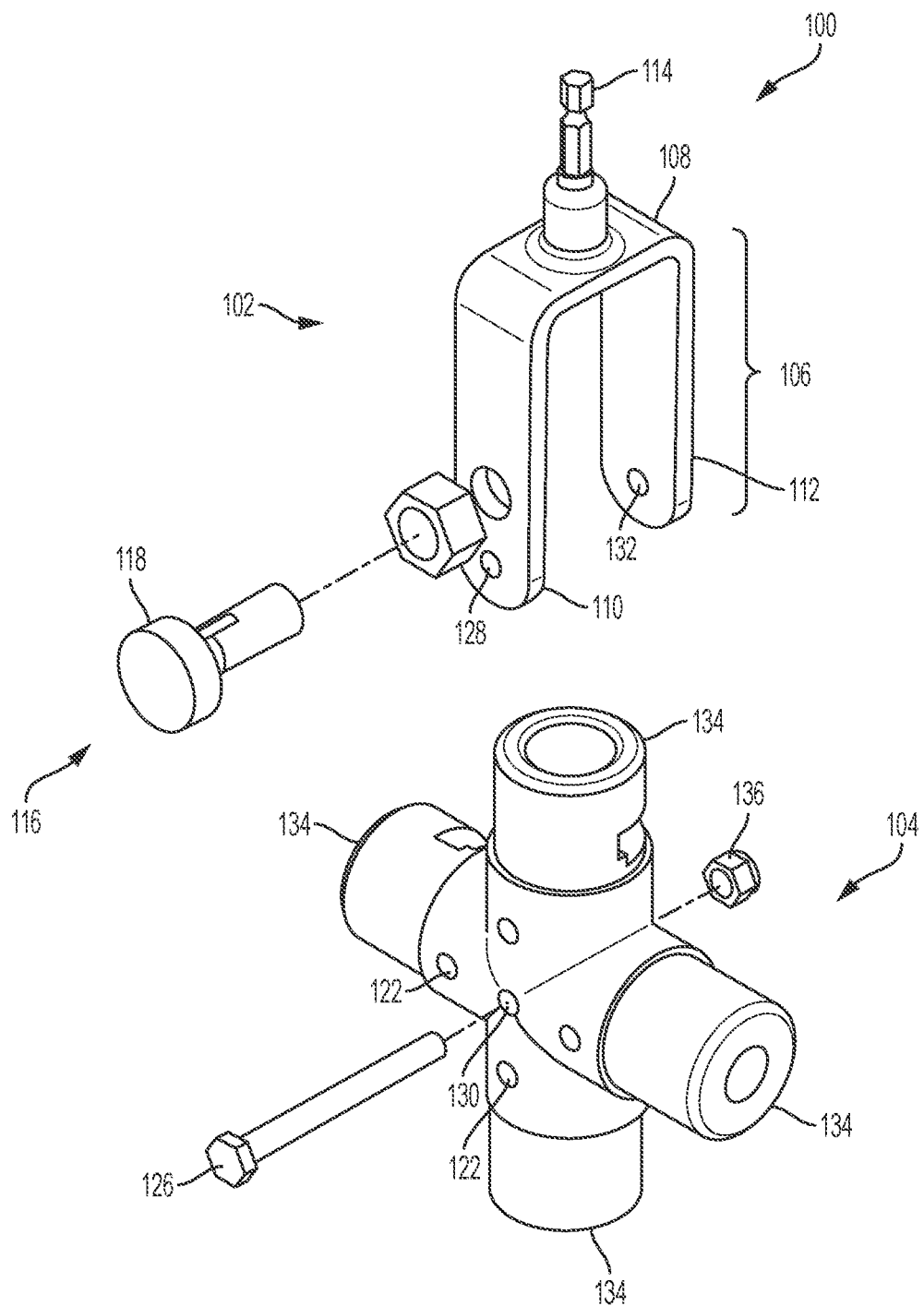
FIG. 1 is an expanded, perspective view of an embodiment of an adapter and a cable stripping device.

FIG. 1 shows an example of a cable stripping assembly 100, according to one embodiment. The assembly can comprise the main components of: an adapter 102, and a cable stripper 104. The adapter may comprise a bracket 106 comprising an end portion 108, a first side 110, and a second side 112 extending from the end portion 108. The adapter may further comprise an engagement member 114. In some embodiments, such as those shown in FIGS. 1-4, the engagement member 114 extends from the end portion 108 in a direction substantially opposite the first and second sides, 110, 112.

In some embodiments the engagement member 114 is configured to releasably couple with a factory power drill chuck. The engagement member 114 may be sized to fit within a power drill chuck and allow the chuck to be tightened around the member. In other embodiments, the engagement member may be detachably connected such that differently sized engagement members may be used for different power drill types, or for use with other power sources.

Figure 2:
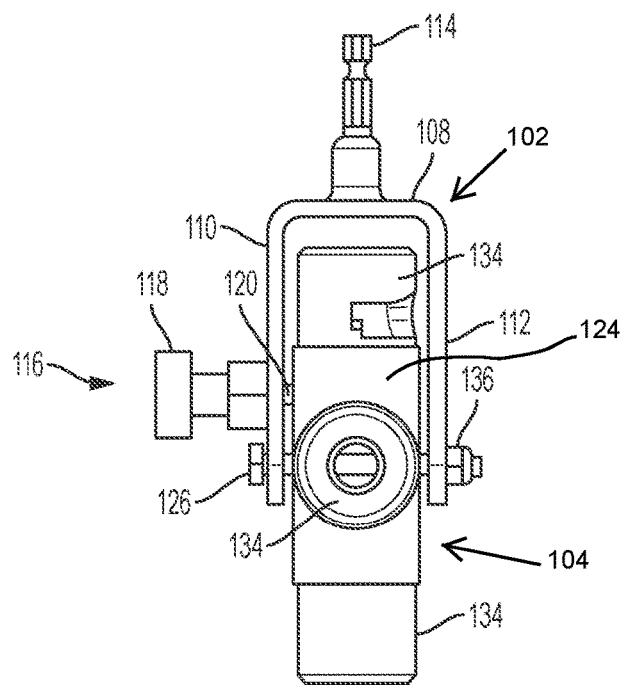
FIG. 2 is a side elevation view of the adapter of FIG. 1 shown mounted to a cable stripping device with the adapter in a locked position.

In some embodiments shown in FIGS. 1-4, the adapter may comprise a locking mechanism 116 situated on either the first side 110 or the second side 112. In some embodiments the locking mechanism 116 may comprise an actuator 118 and a locking member 120 (shown in FIG. 2). When in the locked position, the locking member 120 may extend into a corresponding recess 122 (as shown in FIG. 1) in the body 124 of the cable stripper 104, as shown in FIG. 2. In some embodiments the actuator comprises a knob that when pulled by a user retracts the locking member 120 from the corresponding recess 122 and allows the cable stripper 104 to pivot relative to the adapter 102. In other embodiments the actuator may be a button that when depressed moves the adapter between a locked and unlocked position. In other embodiments the actuator may be a lever, latch, or other actuation mechanism.

In some embodiments the locking mechanism may default to a locked position. In such embodiments twisting the actuator may hold the locking mechanism in an unlocked position without the further application of force by a user, allowing a user to pivot the cable stripping tool without having to hold the locking mechanism in the unlocked position. In other embodiments the locking mechanism 116 may be manually adjusted to a locked position by sliding the locking member 120 into a corresponding recess 122 in the body of the cable stripper. In other embodiments the locking mechanism may default to an unlocked position. In such embodiments twisting the actuator may hold the locking mechanism in a locked position, for example, by engaging a protrusion of the locking member with the body of the cable stripper.

Figure 3:
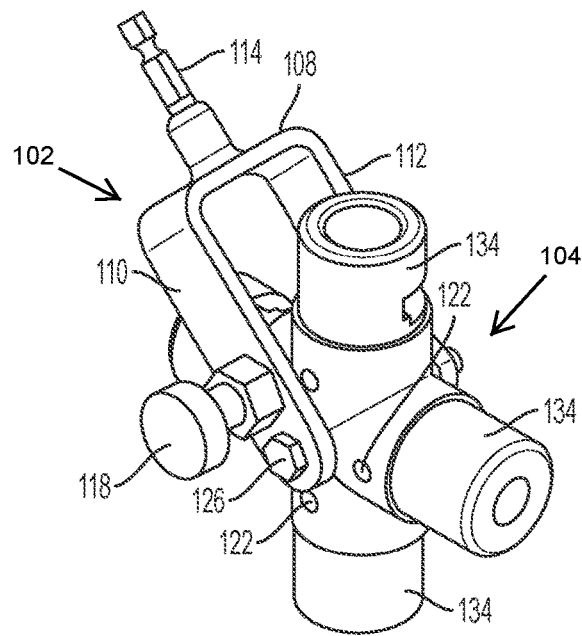
FIG. 3 is a perspective view of the adapter of FIG. 1 shown mounted to a cable stripping device with the adapter in the unlocked position.
Figure 4:
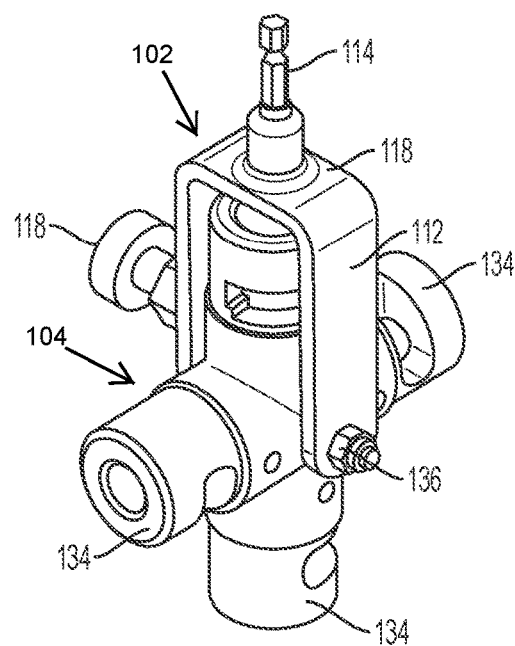
FIG. 4 is a perspective view of the adapter of FIG. 1 shown mounted to a cable stripping device with the adapter in a locked position.

FIGS. 2 and 4 show the adapter in the locked position, wherein the locking member 120 extends into the corresponding recess 122 of the body 124 of the cable stripper and prevents movement of the cable stripper 104 relative to the adapter 102. FIG. 3 shows the adapter 102 in the unlocked position wherein the cable stripper may pivot 104 freely.

The adapter 102 can be coupled to the cable stripper 104 via permanent, semi-permanent, or reversible means. FIGS. 1-4 illustrate an aspect where the adapter 102 is mounted to the cable stripper 104 via mechanical fasteners, such as the illustrated pivot pin. In other embodiments, other techniques or mechanisms can be used to attach the adapter to the cable stripper.

In some embodiments, shown in FIGS. 1-4, the adapter 102 can be attached to the cable stripper 104 via a pivot pin 126 extending through a first opening 128 in the first side 110 of the bracket, through an opening 130 in the body 124 of the cable stripper 104, and through a second opening 132 in the second side 112. The pivot pin 126 may be secured using a nut 136. This configuration allows the cable stripper 104 to pivot relative to the adapter 102. This allows a user to pivot the cable stripper 104 in order to select a desired cutting head 134.

In alternative embodiments, the first and second sides of the bracket may comprise first and second posts extending from an inner surface of the sides. The first and second posts may correspond to first and second recesses in the body of the cable stripper, and, when inserted into the first and second recesses, the first and second posts may attach the adapter to the cable stripper, while still allowing the cable stripper to pivot in relation to the adapter. In some embodiments the sides 110, 112, of the bracket 106 may comprise a material with some flexibility. In some embodiments the sides 110, 112, may be biased inward to hold the first and second posts within their respective recesses.

In some embodiments the adapter is configured for use with a cable stripper 104 having one or more cutting heads. In some embodiments the cable stripper may have two or three cutting heads disposed at terminal ends of the cable stripper. Preferably the adapter is configured for use with a cable stripper having four cutting heads arranged in a coplanar X shape, as shown in FIGS. 1-4.

Various materials can be used to form the bracket 106, engagement member 114, locking mechanism 116, and pivot pin 126. Preferably these components are formed from a metal or metal alloy (e.g. aluminum, steel, tool steel, stainless steel).

Some embodiments comprise a method for using a cable stripping assembly, such as the assembly shown in FIGS. 1-4, to remove insulation from a cable or wire. In some embodiments the method may comprise selecting a cutting head 134 of the cable stripper 104 of the desired size to match the cable. Coupling the adapter 102 to a power drill, applying the selected cutting head 134 to a cable, activating the power drill such that the cutting head 134 of the cable stripper 104 rotates with respect to the cable, and stripping a selected amount of insulation from the cable.

In some embodiments the method additionally comprises coupling the adapter 102 to the cable stripper 104. In some embodiments the adapter 102 may be coupled to the cable stripper 104 via a pivot pin 126. In other embodiments the adapter 102 may be coupled to the cable stripper 104 via posts extending from an inner surface of the sides 110, 112 of the adapter bracket 106, which fit within corresponding recesses in the body of the cable stripper.

In some embodiments the step of coupling the adapter 102 to a power drill comprises inserting an engagement member 114 of the adapter 102 into a chuck of the power drill and tightening the chuck.

In some instances, it may be necessary for the cable stripping assembly to be used on cables of different gauges during a single job. In such instances the method of use may further comprise releasing a locking mechanism 116 of the adapter 102, pivoting the cable stripper 104 to a selected second cutting head 134, allowing the locking mechanism 116 of the adapter to engage, applying the second cutting head to a second cable, activating the power drill such that the second cutting head rotates with respect to the second cable, and stripping a selected amount of insulation from the second cable. These steps may be repeated as many times as needed to strip all differently-sized cables necessary for a given job.

In some embodiments the step of releasing the locking mechanism 116 comprises retracting a locking member 120 of the adapter 102 from the corresponding recess 122 in the body 124 of the cable stripper 104. This may comprise pulling an actuator 118 to retract the locking member 120. In other embodiments, the step of releasing the locking mechanism may comprise pressing a button, lifting or pressing a lever, or manually retracting the locking member. In some embodiments, the step of allowing the locking mechanism 116 to engage may comprise releasing the actuator 118 and allowing the locking member 120 to return to a default position within a corresponding recess 122 of the cable stripper 104. In other embodiments allowing the locking mechanism 116 to engage may comprise manually sliding the engagement member 120 into a corresponding recess 122.

In certain embodiments when the adapter is used to allow a cable stripper to be used with a power drill, a user does not use open blade cutting implement such as a knife or cutting device other than the cable stripper to remove insulation from the cable. By using the cable stripper and adapter assembly instead of a knife, the user incurs a much lesser risk of injury than by using a knife or other open blade cutting implement.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples. In view of the many possible embodiments to which the principles of the disclosed technology may be applied, it should be recognized that the illustrated embodiments are only preferred examples and should not be taken as limiting the scope of the disclosed technology.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. For example, the step of selecting a cutting head of the cable stripper may be performed before or after the adapter is coupled to the power drill.

Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "connected" generally mean electrically, electromagnetically, and/or physically (e.g., mechanically or chemically) coupled or linked and does not exclude the presence of intermediate elements between the coupled or associated items absent specific contrary language.

Directions and other relative references (e.g., inner, outer, etc.) may be used to facilitate discussion of the drawings and principles herein, but are not intended to be limiting. For example, certain terms may be used such as "lower," "upper" and the like. Such terms are used, where applicable, to provide some clarity of description when dealing with relative relationships, particularly with respect to the illustrated embodiments. Such terms are not, however, intended to imply absolute relationships, positions, and/or orientations. As used herein, "and/or" means "and" or "or", as well as "and" and "or".

In view of the many possible embodiments to which the principles of the disclosed invention may be applied, it should be recognized that the illustrated embodiments are only preferred examples of the invention and should not be taken as limiting the scope of the invention. Rather, the scope of the disclosure is defined by the following claims.

I claim:

1. An adapter, comprising:
    a bracket comprising an end portion, and a first side and a second side extending from the end portion;
    an engagement member extending from the end portion of the bracket in a direction substantially opposite the first and second sides, the engagement member configured such that the engagement member can be inserted into a factory power drill chuck and the factory power drill chuck can be releasably tightened around the engagement member;
    a pivot pin configured to couple the bracket to a cable stripper, the pivot pin extending through the first and second sides of the bracket to permit the bracket to pivot around the axis of the pivot pin while the bracket is coupled to the cable stripper; and
    a locking mechanism coupled to the first side of the bracket, the locking mechanism comprising a locking member extending through the first side and an actuator operable to move the locking member between a locked position wherein the bracket is restrained from movement relative to the cable stripper and an unlocked position wherein the bracket can pivot relative to the cable stripper around the pivot pin.

2. The adapter of claim 1, wherein the adapter is releaseably coupled to a cable stripper by the pivot pin extending through the first side of the bracket, a body of the cable stripper, and the second side of the bracket.

3. The adapter of claim 1, wherein, when in the locked position, the locking member extends into a corresponding recess in the body of the cable stripper.

4. The adapter of claim 3, wherein the actuator is a knob that when pulled by a user retracts the locking member relative to the body of the cable stripper.

5. The adapter of claim 1, wherein the actuator is a button.

* * * * *